(12) United States Patent
Stimmel et al.

(10) Patent No.: US 9,957,863 B2
(45) Date of Patent: May 1, 2018

(54) EXHAUST CONDUITS FOR MARINE ENGINE EXHAUST SYSTEMS

(71) Applicant: Indmar Products Company, Inc., Millington, TN (US)

(72) Inventors: Jason C. Stimmel, Eads, TN (US); Richard J. Waggoner, Punta Gorda, FL (US); Kevin J. Kimball, Mount Dora, FL (US); Rachel M. Mashburn, Memphis, TN (US); Timothy G. Anderson, Brigton, TN (US); Timothy G. Maher, Drummonds, TN (US)

(73) Assignee: Indmar Products Company, Inc., Millington, TN (US)

( * ) Notice: Subject to any disclaimer, the term of this patent is extended or adjusted under 35 U.S.C. 154(b) by 110 days.

(21) Appl. No.: 15/194,002

(22) Filed: Jun. 27, 2016

(65) Prior Publication Data

US 2017/0370258 A1    Dec. 28, 2017

(51) Int. Cl.
| | | |
|---|---|---|
| *B63H 21/32* | (2006.01) | |
| *F01N 3/04* | (2006.01) | |
| *F01N 3/08* | (2006.01) | |
| *F16L 23/02* | (2006.01) | |
| *F16L 23/12* | (2006.01) | |

(52) U.S. Cl.
CPC ............ *F01N 3/043* (2013.01); *B63H 21/32* (2013.01); *F01N 3/08* (2013.01); *F16L 23/02* (2013.01); *F16L 23/12* (2013.01); *F01N 2260/024* (2013.01); *F01N 2340/00* (2013.01); *F01N 2590/02* (2013.01)

(58) Field of Classification Search
CPC ................ F01N 3/2046; F01N 13/004; F01N 2260/024; F01N 3/043; F01N 13/009; F01N 3/08; F01N 2340/00; F01N 2590/02; F01P 2060/16; B63H 21/32; F16L 23/02; F16L 23/12
See application file for complete search history.

(56) References Cited

U.S. PATENT DOCUMENTS 6,250,976 B1 *  6/2001  Ozawa ...................... F01N 3/28
                                                    440/1
6,343,417 B1 *  2/2002  Bonny .................. F01N 13/102
                                                 29/455.1

(Continued)

*Primary Examiner* — Brandon Lee
(74) *Attorney, Agent, or Firm* — Wood Herron & Evans LLP

(57) ABSTRACT

An exhaust conduit for a marine exhaust system includes an inlet end portion connectable to an exhaust manifold, an outlet end portion that directs exhaust gases toward an exhaust system outlet, a catalytic converter assembly arranged between the inlet and outlet end portions, and inner and outer tubes. The inner tube directs exhaust gases from the exhaust manifold to the catalytic converter assembly, and the outer tube surrounds the inner tube to define a cooling liquid passage between the inner and outer tubes. A flange is secured to the inner and outer tubes at inlet ends thereof, the flange being connectable to an outlet of the exhaust manifold. The inner tube has a uniform diameter between the flange and the catalytic converter assembly, and is welded to the flange independently of the outer tube. First and second welds join the inner and outer tubes to the flange at radially inner and outer faces, respectively, of a flange rim.

20 Claims, 8 Drawing Sheets

(56) References Cited

U.S. PATENT DOCUMENTS

| | | |
|---|---|---|
| 7,552,586 B1 | 6/2009 | White |
| 7,699,675 B1 | 4/2010 | Powers et al. |
| 7,803,026 B2 | 9/2010 | McKinney |
| 8,650,864 B2 | 2/2014 | Waggoner et al. |
| 2014/0086804 A1* | 3/2014 | Gruenwald ............... F01N 3/04 422/173 |
| 2014/0216423 A1* | 8/2014 | Mitsubayashi ......... F28F 19/06 123/568.12 |

* cited by examiner

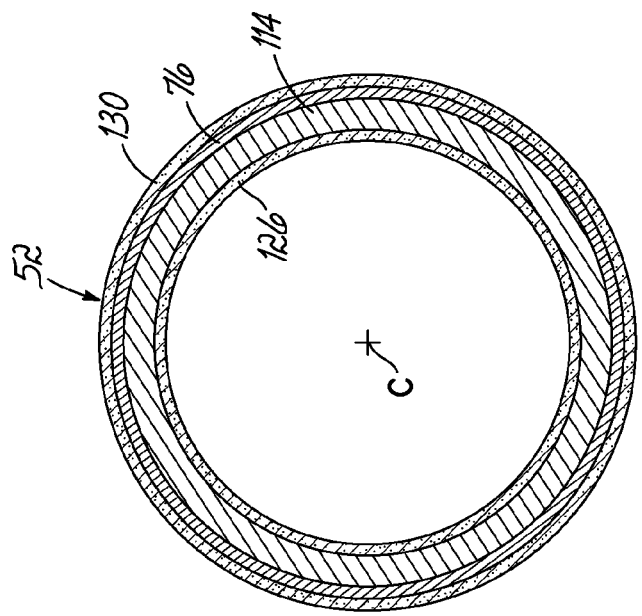
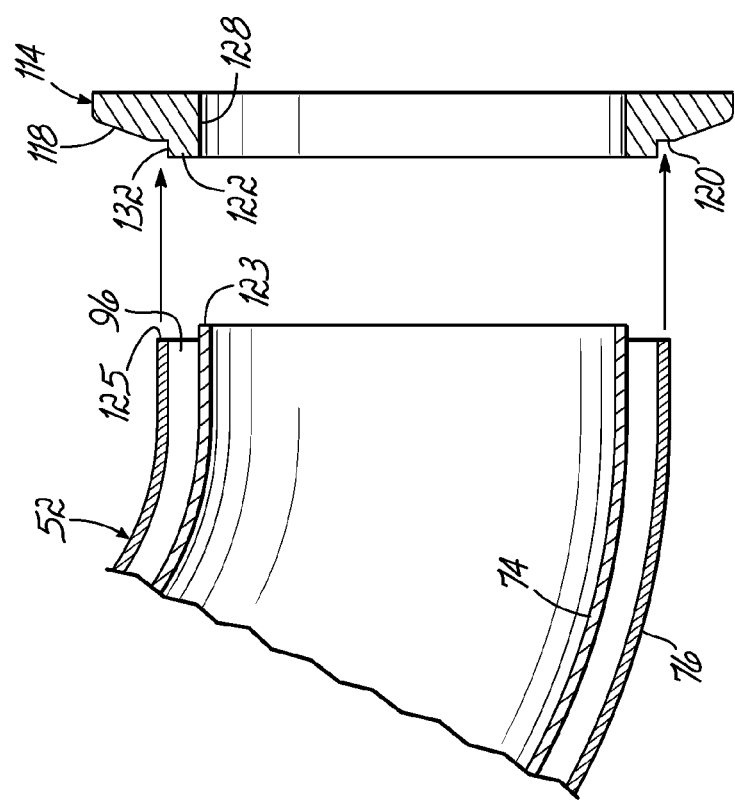
FIG. 6
FIG. 5C

EXHAUST CONDUITS FOR MARINE ENGINE EXHAUST SYSTEMS

TECHNICAL FIELD

The present invention relates generally to exhaust systems for marine engines, and more particularly, to liquid-cooled marine engine exhaust systems.

BACKGROUND

Exhaust systems for marine engines generally include an exhaust manifold connected to the engine at each row (or "bank") of engine cylinders, and a corresponding exhaust conduit coupled to the exhaust manifold for directing exhaust gases from the manifold to an exhaust outlet. In conventional exhaust systems, the exhaust conduit includes a horizontally oriented catalytic converter assembly having a catalyst that removes harmful emissions from the exhaust gases before being expelled through the exhaust outlet.

Exhaust systems can experience extremely high temperatures during use. For example, the core temperature of a catalytic converter in a conventional exhaust system can reach upwards of 1,000 degrees Fahrenheit (° F.) or more. For safety purposes, the U.S. Coast Guard requires that exterior surface temperatures of marine engine exhaust systems be maintained below 200° F. Accordingly, components of conventional marine engine exhaust systems, including the catalytic converter assemblies, are often liquid-cooled to ensure safe and compliant operating temperatures.

Referring to FIG. 1, an inlet end portion of an exhaust conduit 1 of a conventional marine engine exhaust system is shown. The exhaust conduit 1 includes an inner (or "exhaust") tube 2 and an outer tube 3 that surrounds and is spaced radially outward from the inner tube 2 so as to define a passage 4 through which cooling liquid L, such as water, is directed from an inlet hose 12. The inner and outer tubes 2, 3 are pinched together at their inlet ends to form a cylindrical pinched portion 5. A first weld 7 joins the inner and outer tubes 2, 3 together at the pinched portion 5, and also joins to a conduit flange 6. A second weld 8 joins an outer surface of the outer tube 3 to the conduit flange 6. The exhaust conduit 1 is then coupled to an exhaust manifold 9 by coupling the conduit flange 6 to a corresponding manifold flange 10, so that the exhaust conduit 1 may direct hot exhaust gases G toward an exhaust outlet (not shown).

The pinched portion 5 of the exhaust conduit 1 is formed by deforming the inlet end portion of the inner tube 2 radially outward so as to define a conical flared portion 11 having a non-uniform cross-sectional diameter that varies along a length of the inner tube 2 at its inlet end portion. This deformation step results in a decreased (or thinned) wall thickness of the inner tube 2 at its inlet end portion, for example at the flared portion 11, thereby undesirably weakening this portion of the inner tube 2. Further, this configuration of the exhaust conduit 1 provides an inlet end of the cooling passage 4 with a tapered configuration that tends to trap precipitated salts and other particulate from cooling liquid L, particularly when the cooling liquid L is in the form of water. It has been observed that buildup of these salts and particulate, in combination with the decreased wall thickness of the inner tube 2, may disadvantageously result in corrosion and eventual cracking of at least the inner tube 2 at its inlet end portion. Such cracking can cause cooling liquid L to leak from the cooling passage 4, thereby depriving the exhaust conduit 1 of necessary cooling.

An additional disadvantage of the known configuration shown in FIG. 1 is that the conduit flange 6, which directly contacts the extremely hot exhaust manifold flange 10, is deprived of direct cooling. As shown, the flange 6 is separated from the cooling passage 4 by the circumferential pinched portion 5. As such, the cooling liquid L is unable to directly contact and cool the flange 6, and the flange 6 thus may exhibit extremely high and unsafe surface temperatures compared to surface temperatures of neighboring components of the exhaust system.

Accordingly, there is a need for improvements to known marine engine exhaust systems to address these and other shortcomings.

SUMMARY

According to an exemplary embodiment of the invention, an exhaust conduit for a marine exhaust system includes an inlet end portion connectable to an exhaust manifold, an outlet end portion that directs exhaust gases toward an exhaust system outlet, and a catalytic converter assembly arranged between the inlet and outlet end portions. The exhaust conduit further includes an inner tube that directs exhaust gases from the exhaust manifold to the catalytic converter assembly, an outer tube surrounding the inner tube so as to define a cooling liquid passage between the inner and outer tubes, and a flange secured to the inner and outer tubes at inlet ends thereof, the flange being connectable to an outlet of the exhaust manifold. The inner tube has a uniform diameter between the flange and the catalytic converter assembly.

According to another exemplary embodiment of the invention, an exhaust conduit for a marine exhaust system includes an inner tube that directs exhaust gases from an exhaust manifold toward an exhaust system outlet, an outer tube surrounding the inner tube so as to define a cooling liquid passage between the inner and outer tubes, and a flange welded to the inner and outer tubes at inlet ends thereof and being connectable to an outlet of the exhaust manifold. The inner tube is welded to the flange independently of the outer tube.

According to another exemplary embodiment of the invention, an exhaust conduit for a marine exhaust system includes an inner tube that directs exhaust gases from an exhaust manifold toward an exhaust system outlet, an outer tube surrounding the inner tube so as to define a cooling liquid passage between the inner and outer tubes, and a flange secured to the inner and outer tubes at inlet ends thereof. The flange is connectable to an outlet of the exhaust manifold and includes an annular rim. A first weld joins the inner tube to the flange at a radially inner face of the annular rim, and a second weld joins the outer tube to the flange at a radially outer face of the annular rim.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The drawings, which are incorporated in and constitute a part of this specification, illustrate embodiments of the invention and, together with the general description given above and the detailed description given below, serve to explain the embodiments of the invention.

FIG. 5C is a disassembled view of the inlet end portion of the exhaust conduit of FIG. 5A.

FIG. 6 is an axial cross-sectional view taken along line 6-6 in FIG. 5B.

DETAILED DESCRIPTION

Figure 1:
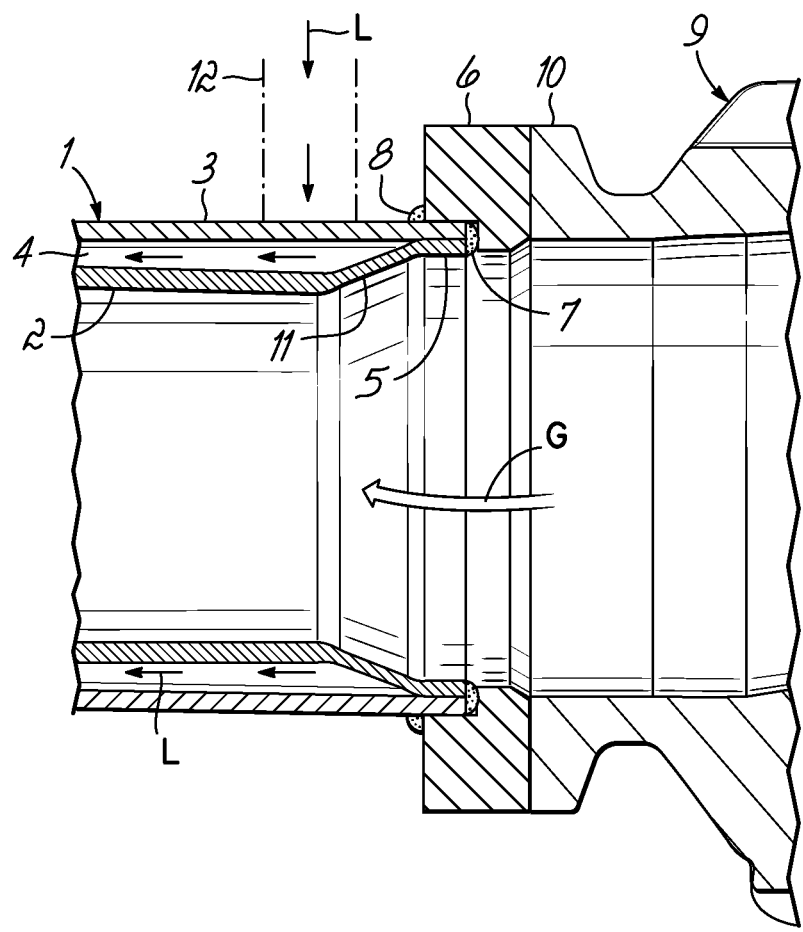
FIG. 1 is a partial side cross-sectional view of an exhaust conduit and an exhaust manifold of a known marine engine exhaust system.
Figure 2:
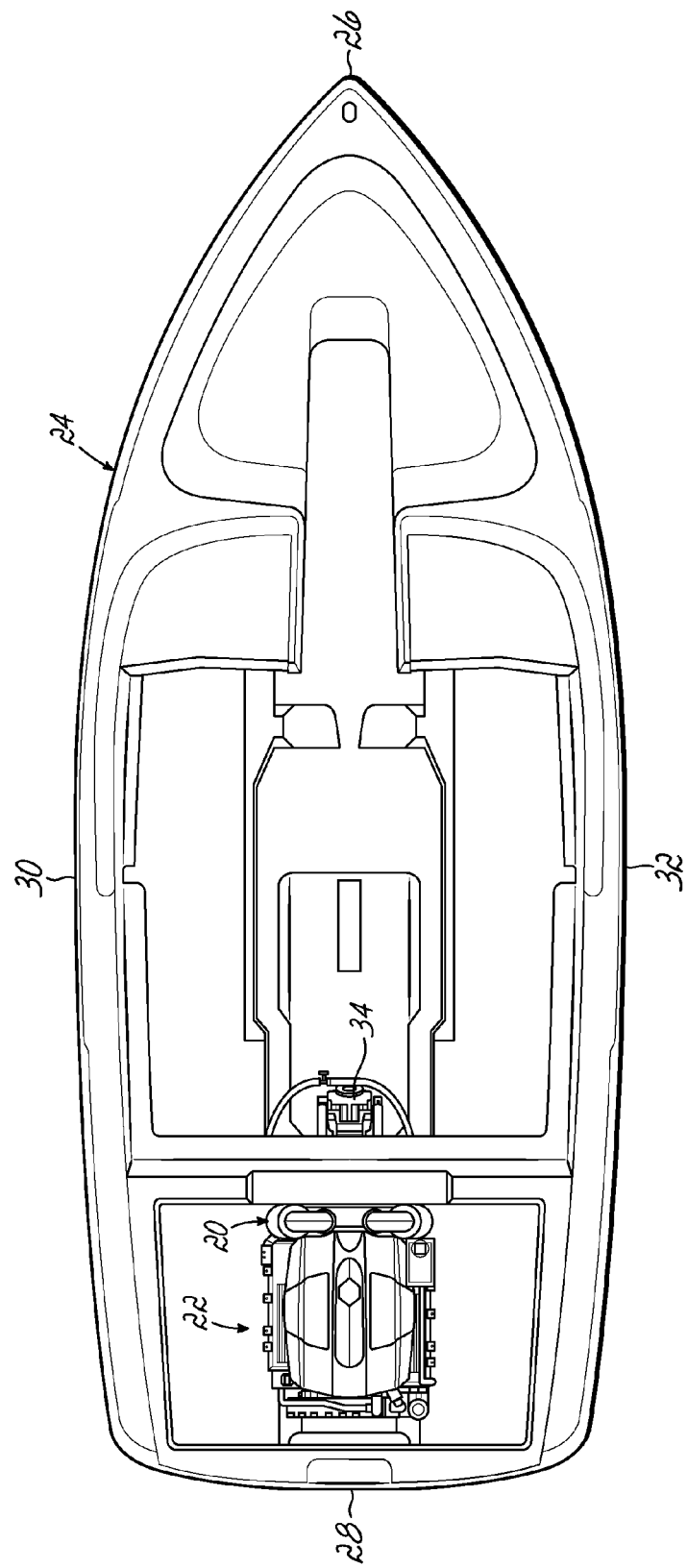
FIG. 2 is a top view of a motorboat including an inboard engine and an exhaust system coupled to the engine.

Referring to FIG. 2, an exhaust system 20 according to an exemplary embodiment of the invention is shown mounted to a marine engine 22 within a motorboat 24. The motorboat 24 includes a bow 26, a stern 28, a port side 30, and a starboard side 32. The engine 22 is shown mounted in an "inboard" configuration and is coupled to a V-drive transmission 34 that drives a propeller shaft and propeller (not shown) to rotate, which propels the motorboat 24 through the water.

Figure 3:
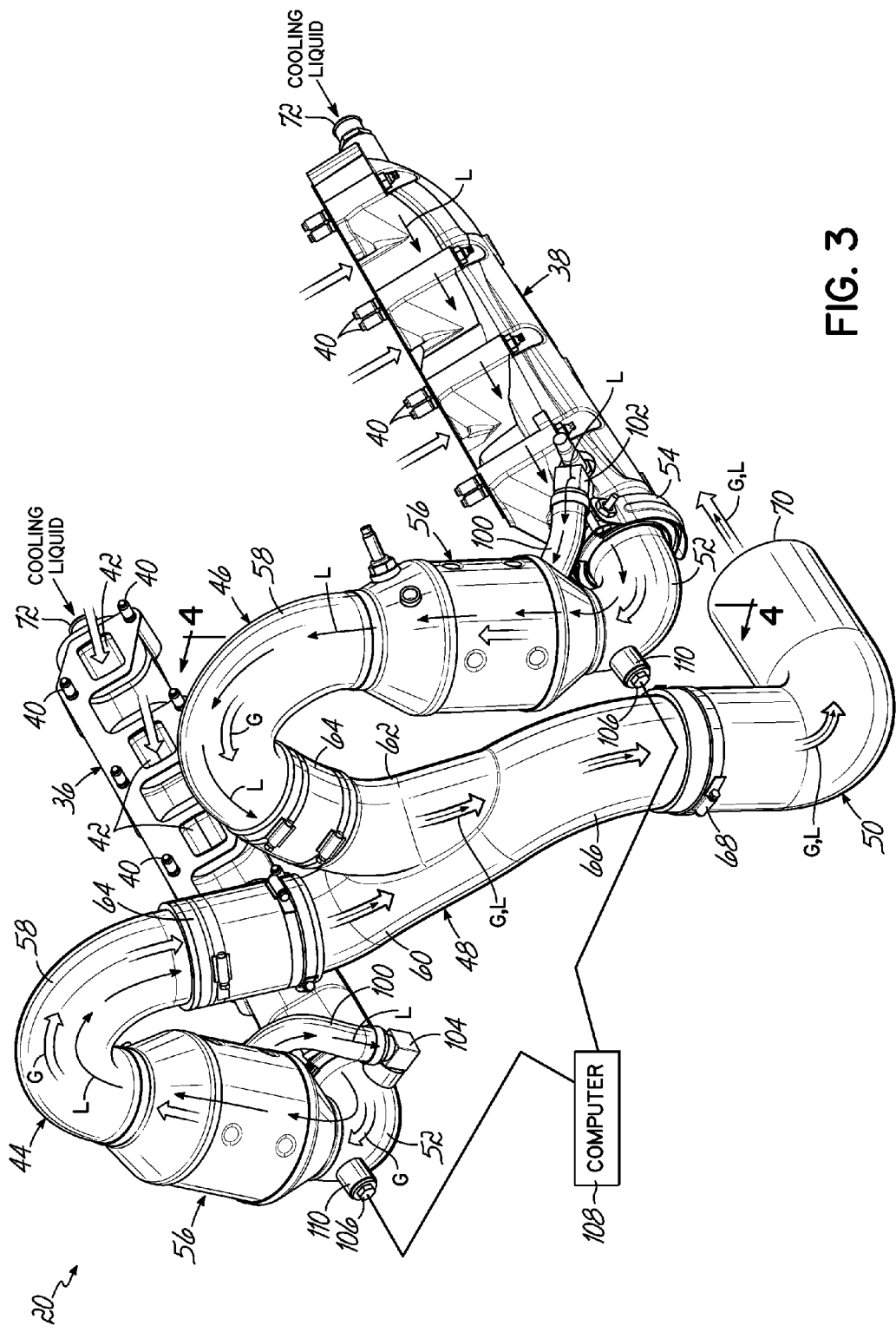
FIG. 3 is a perspective view of a marine engine exhaust system according to an exemplary embodiment of the invention.

Referring to FIG. 3, the exemplary exhaust system 20 is shown in greater detail, with the engine 22 being hidden from view. The exhaust system 20 generally includes a first exhaust manifold 36 that couples to a first bank of cylinders (not shown) of the engine 22 and a second exhaust manifold 38 that couples to a second bank of cylinders (not shown) of the engine 22 via threaded bolts 40. The engine 22 of FIG. 2 is shown in the form of a "V-8" engine, having two banks of four cylinders arranged in a known V-configuration. As such, each of the exhaust manifolds 36, 38 includes four exhaust inlet ports 42, each aligned with and receiving hot exhaust gases G expelled from a respective cylinder of the engine 22. In alternative embodiments, the exhaust manifolds 36, 38, as well as other components of the exemplary exhaust systems disclosed herein, may be modified as desired to accommodate marine engines 22 having various alternative quantities and configurations of cylinders.

The exhaust system 20 further includes first and second riser conduits 44, 46, a Y-pipe 48, and an exhaust outlet conduit 50. Each of the first and second riser conduits 44, 46 includes a lower riser section 52 defining an inlet end portion of the riser conduit 44, 46 coupled to a respective exhaust manifold 36, 38 with a clamp 54; a catalytic converter assembly 56 extending generally vertically from the lower riser section 52; and an upper riser section 58 extending upwardly from the catalytic converter assembly 56 and turning downwardly toward the Y-pipe 48 and defining an outlet end portion of the riser conduit 44, 46.

The Y-pipe 48 includes first and second inlet legs 60, 62 coupled to the first and second riser conduits 44, 46, respectively, with clamped hoses 64, and an outlet leg 66 coupled to the exhaust outlet conduit 50 with a clamp 68. More specifically, the first inlet leg 60 couples to the outlet end of the upper riser section 58 of the first riser conduit 44, and the second inlet leg 62 couples to the outlet end of the upper riser section 58 of the second riser conduit 46.

Figure 4:
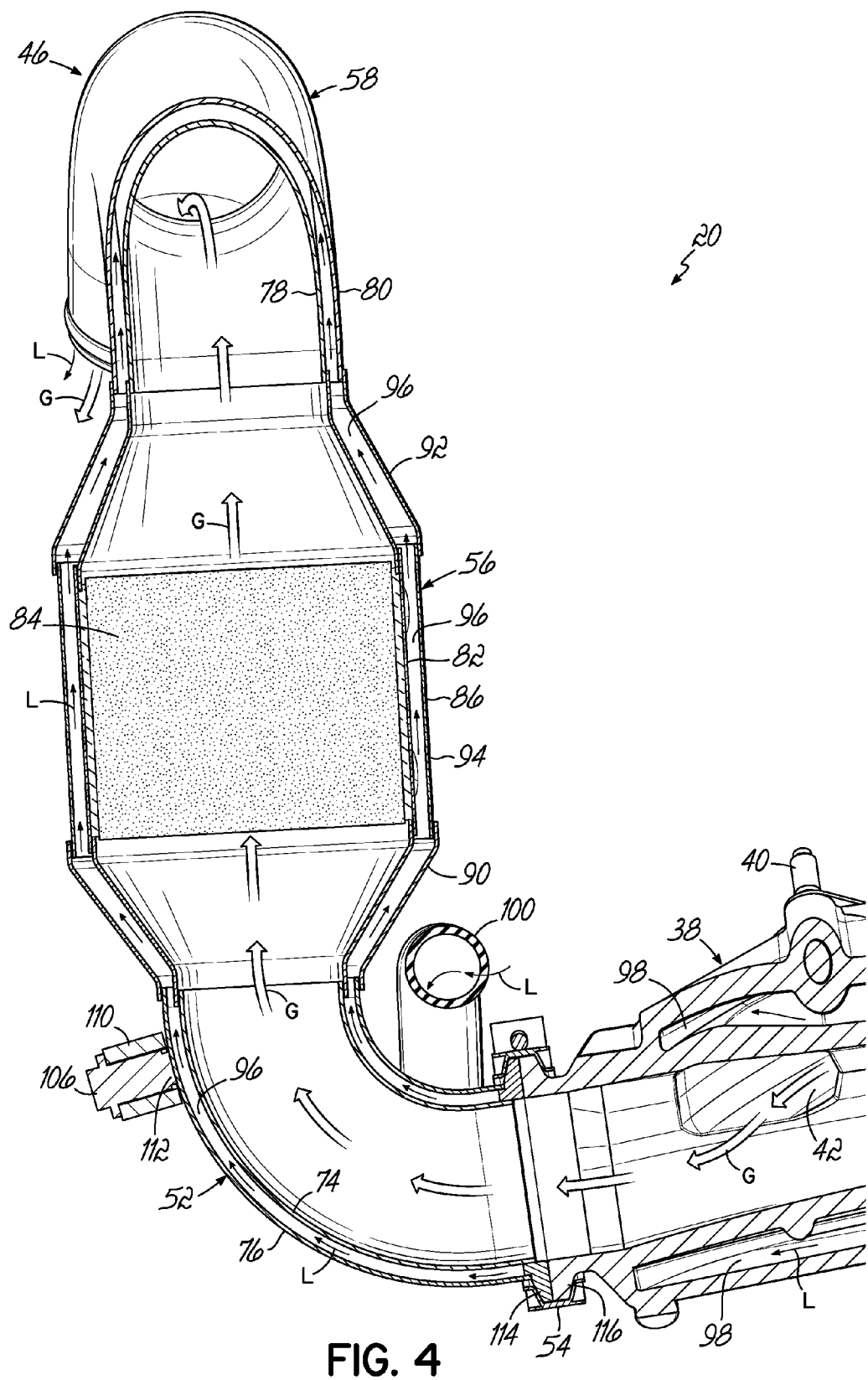
FIG. 4 is a side cross-sectional view taken along line 4-4 in FIG. 3, showing details of an exhaust conduit and an exhaust manifold of the exhaust system.

As shown by directional arrows G in FIGS. 3 and 4, exhaust gases G are expelled from the engine 22 into the exhaust manifolds 36, 38. Each exhaust manifold 36, 38 combines the incoming exhaust gases G into a stream, and directs the stream into the lower riser section 52 of the respective riser conduit 44, 46. The exhaust gases G turn upwardly within the lower riser sections 52 and are directed through the catalytic converter assemblies 56, which reduce toxic pollutants in the exhaust gases G. Upon exiting the upper ends of the catalytic converter assemblies 56, the streams of exhaust gases G are directed through the upper riser sections 58 and then into the Y-pipe 48, which combines the two streams of exhaust gases G into a single stream. The unified stream of exhaust gases G is then directed through the outlet leg 66 of the Y-pipe 48 and into the exhaust outlet conduit 50, which directs the exhaust gases G through an exhaust system outlet 70.

The physical configuration of the exhaust outlet conduit 50 as shown in FIG. 3 is merely exemplary. The exhaust outlet conduit 50 may extend for any desired length and with any configuration suitable for directing the exhaust gases G to an external environment. For example, an outlet end of the exhaust outlet conduit 50 may extend externally through a transom or a side of the hull of the motorboat 24, and may include an exhaust tip (not shown) of various types known in the art, for example.

The outer surfaces of the exhaust system 20 are maintained at safe operating temperatures, for example below 200° F., via liquid cooling. More specifically, the exhaust system 20 includes internal cooling passages (referred to collectively as a cooling "jacket"), described below, that circulate cooling liquid L through the components of the exhaust system 20 during operation. In exemplary embodiments, the cooling liquid L may be in the form of water, such as "raw" water drawn from the body of water (e.g., lake or ocean) in which the motorboat 24 is operating. Those skilled in the art will appreciate that the cooling liquid L may take various other forms, such as a synthetic coolant mixture, for example.

Referring to FIG. 4, additional features of the second exhaust manifold 38 and the second riser conduit 46 are shown. While not shown or described in detail, it will be understood that the first exhaust manifold 36 and the first riser conduit 44 are formed with similar structural features.

As shown in FIG. 4, the lower riser section 52 includes an inner tube 74 and an outer tube 76 surrounding and spaced radially outward from the inner tube 74. Likewise, the upper riser section 58 includes an inner tube 78 and an outer tube 80 surrounding and spaced radially outward from the inner tube 78. Similarly, the catalytic converter assembly 56 includes an inner can 82 that houses a catalyst element 84, and an outer can 86 surrounding and spaced radially outward from the inner can 82. The catalytic converter assembly 56 also includes inlet and outlet cone portions 90, 92 that taper from an intermediate portion 94 having an enlarged diameter for accommodating the catalyst element 84. The catalyst element 84 removes toxic pollutants from the exhaust gases G, as described above.

The inner and outer tubes 74, 76 of the lower riser section 52, the inner and outer cans 82, 86 of the catalytic converter assembly 56, and the inner and outer tubes 78, 80 of the upper riser section 58 collectively define a riser cooling passage 96, and may be arranged concentrically. As shown in FIGS. 3 and 4, the riser cooling passages 96 communicate with manifold cooling passage 98 (shown in exhaust manifold 38 in FIG. 4) via a cooling hose 100. Each cooling hose 100 is coupled at an inlet end to a manifold fitting 102 arranged on an outlet end portion of the respective exhaust manifold 36, 38 (see, e.g., exhaust manifold 38 in FIG. 3) and coupled at an outlet end to a riser fitting 104 arranged on an inlet end portion on the lower riser section 52 of the respective riser conduit 44, 46 (see, e.g., riser conduit 44 in FIG. 3).

As shown by directional arrows L in FIGS. 3 and 4, cooling liquid L is directed into the cooling inlets 72 from an external source (not shown) and flows through the manifold cooling passages 98 in a direction parallel to a flow of the exhaust gases G, without contacting the exhaust gases G. The cooling liquid L then flows through the cooling hoses 100 and into the riser cooling passages 96 of the riser conduits 44, 46. In each riser cooling passage 96, the cooling liquid L flows through the lower riser section 52, upwardly through the catalytic converter assembly 56, and into the upper riser section 58. While in the riser cooling passage 96, the cooling liquid L flows parallel to the exhaust gases G but is separated from the exhaust gases G by the inner tubes 74, 78 and the inner can 82. The cooling liquid L then enters into the Y-pipe 48 where it is combined with the exhaust gases G, as indicated by overlapping arrows G, L in FIG. 3. The combined flows of exhaust gases G and cooling liquid L pass downwardly through the outlet leg 66 of the Y-pipe 48 and into the outlet conduit 50, to be ejected together through the exhaust system outlet 70.

As shown in FIG. 4, the lower riser section 52 curves upwardly from an inlet end portion that is oriented generally horizontally, toward an outlet end portion that is oriented generally vertically. The catalytic converter assembly 56 then extends from the outlet end of the lower riser section 52 in a generally vertical orientation. For example, in exemplary embodiments the catalytic converter assembly 56 may extend along an axis that is approximately 15 degrees or less from perfect vertical. In this regard, the catalytic converter assembly 56 may be angled toward the respective exhaust manifold 36, 38, for example. This generally vertical orientation of the catalytic converter assembly 56 facilitates draining of cooling liquid L from the riser cooling passages 96, through drainage ports (not shown) provided on the exhaust manifolds 36, 38, when the engine 22 is turned off. In such case, residual cooling liquid L in the riser cooling passages 96 drains downwardly, in a direction opposite of the arrows L shown in FIGS. 3 and 4.

With continued reference to FIGS. 3 and 4, the exhaust system 20 may further include a pair of skin temperature sensors 106 that communicate with an onboard computer 108 for monitoring surface temperatures of the riser conduits 44, 46. Each riser conduit 44, 46 may include a boss 110 that supports the respective temperature sensor 106 in contacting relation with an outer surface of the riser conduit 44, 46. As shown, each boss 110 may be arranged on the outer tube 76 of the lower riser section 52 of the respective riser conduit 44, 46. More specifically, the boss 110 may be arranged on a bow-facing side of the lower riser section 52 at a location adjacent to the outlet end of the lower riser section 52, which extends generally vertically with the catalytic converter assembly 56. In one embodiment, the boss 110 may be arranged approximately two inches or less from the inlet cone portion 90 of the catalytic converter assembly 56. Each boss 110 may be formed with a threaded bore that threadedly engages a distal end 112 of the temperature sensor 106 so that the distal end 112 is held in contact with the outer surface of the outer tube 76 of the lower riser section 52.

Those skilled in the art will appreciate that the lower riser section 52 is generally hotter than downstream components of the riser conduit 44, 46, such as the upper riser section 58, due to being located in closer proximity to the exhaust manifold 36, 38. Accordingly, a surface temperature reading taken at a location along the lower riser section 52 is generally representative of one of the hottest surface temperatures exhibited by the riser conduit 44, 46 during operation of the engine 22. Nevertheless, in alternative embodiments the bosses 110 and temperature sensors 106 may be mounted to the riser conduits 44, 46 at various other locations along the length of the riser conduits 44, 46, including at downstream locations such as the on the upper riser sections 58, for example. Additionally, various alternative quantities of temperature sensors 106 may be used as desired.

Each temperature sensor 106 detects a surface temperature of its respective riser conduit 44, 46, and sends a signal to the computer 108 containing information regarding the detected temperature. Communication between the temperature sensors 106 and the computer 108 may be performed via wires directly connecting the temperature sensors 106 to the computer 108, or alternatively via a wireless network, for example. In response to receiving the signals from the temperature sensors 106, the computer 108 determines whether each riser conduit 44, 46 is receiving an adequate flow of cooling liquid L through its riser cooling passage 96. More specifically, the computer 108 may compare each of the detected temperatures to one or more pre-determined threshold temperatures, and then take additional pre-determined action as appropriate.

In an exemplary embodiment, the computer 108 may determine whether each of the detected temperatures is less than or equal to a base threshold temperature of approximately 160° F. If the detected temperatures satisfy this condition, the computer 108 may conclude that the riser conduits 44, 46 are receiving an adequate flow of cooling liquid L. If the detected temperatures do not satisfy this condition, the computer 108 may take further action. More specifically, if one or both of the detected temperatures is between the base threshold temperature and an elevated threshold temperature, such as 190° F. for example, the computer 108 may log a warning condition and provide a warning message to the user, for example by illuminating one or more indicator lights (not shown) or by displaying a message on a digital display (not shown). If one or both of the detected temperatures is greater than the elevated threshold temperature, the computer 108 may instruct an engine control module (not shown) to decrease rpm's of the engine 22 by a predetermined amount, or according to a programmed algorithm, for example. In this manner, the outer surface temperatures of the exhaust system 20 may be maintained within desirable ranges.

Figure 5A:
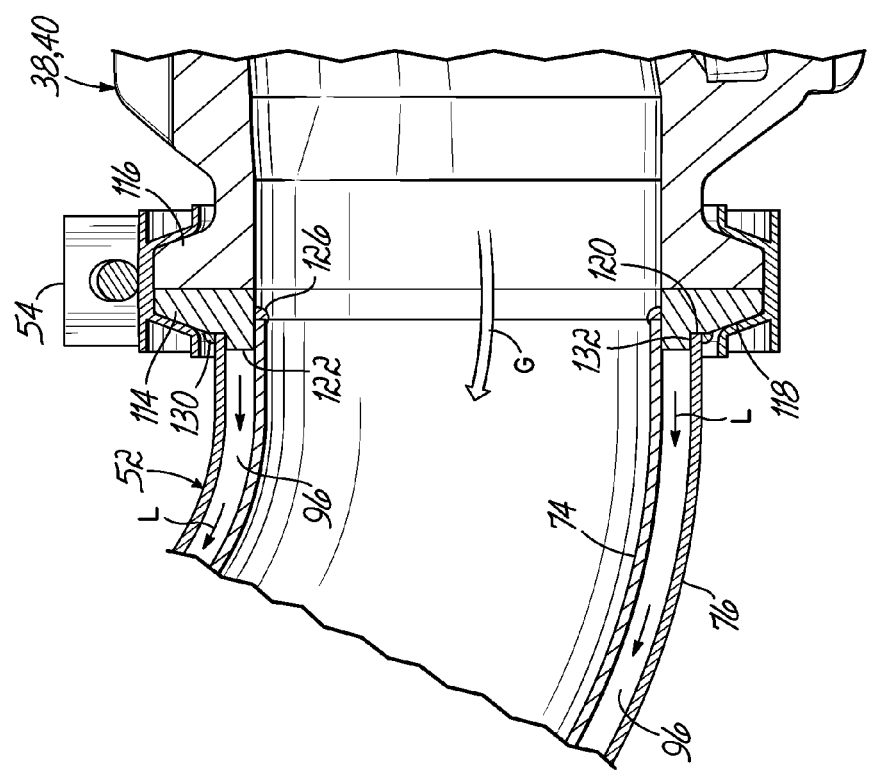
FIG. 5A is an enlarged view of an inlet end portion of the exhaust conduit, an outlet end portion of the exhaust manifold, and a clamp of FIG. 4.
Figure 5B:
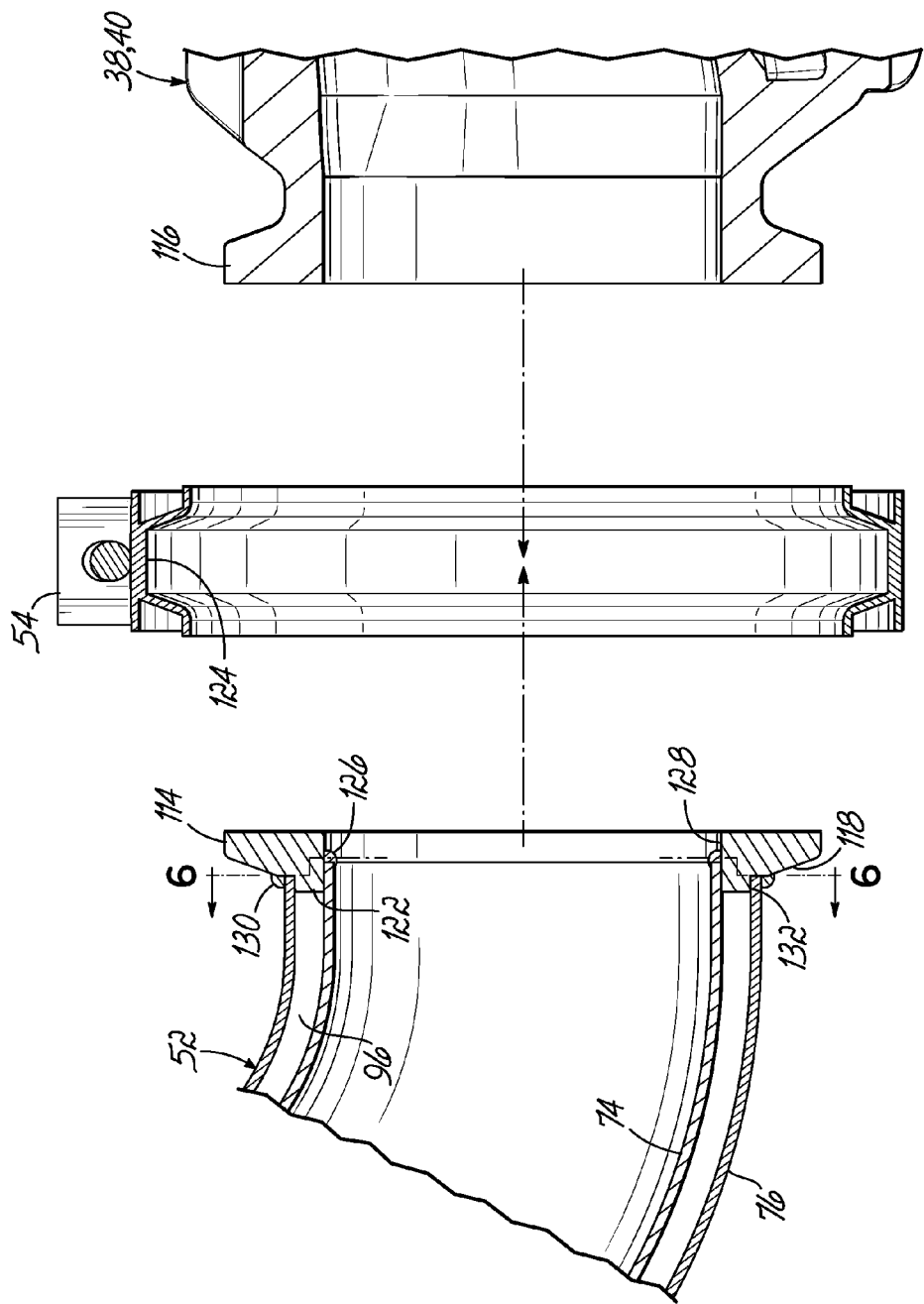
FIG. 5B is a disassembled view of the exhaust system components shown in FIG. 5A.

Referring to FIGS. 5A-6, additional details of the inlet end portion of the lower riser section 52 are shown. An annular riser inlet flange 114 is rigidly secured, for example by welding, to inlet end portions of the inner and outer tubes 74, 76 of the lower riser section 52. The riser inlet flange 114 is configured to abut and releasably couple to an exhaust manifold outlet flange 116 with clamp 54. As shown best in FIG. 5C, the riser inlet flange 114 includes an angled face 118 that extends toward a planar shoulder 120, and an annular rim 122 that projects axially from the shoulder 120 in a downstream direction. As shown in FIG. 5B, the clamp 54 may include an inner circumferential groove 124 having a cross-sectional profile that complements a combined cross-sectional profile of the riser inlet flange 114 and the exhaust manifold outlet flange 116 when aligned with and abutting one another, as shown in FIG. 5A.

An inlet end 123 of the inner tube 74 is welded to the riser flange 114 independently of the outer tube 76, as best shown in FIGS. 5A and 5B. More specifically, the inlet end 123 of the inner tube 74 is secured to the riser flange 114 by an inner first weld 126, and extends along and contacts a cylindrical inner face 128 of the riser flange 114, which coincides with a radially inner face of the annular rim 122. An inlet end 125 of the outer tube 76 is secured to the riser flange 114 by an outer second weld 130 and extends along and contacts a radially outer face 132 of the annular rim 122, and may abut the shoulder 120 of the riser flange 114. Accordingly, the first and second welds 126, 130 are independent from and do not contact one another.

As shown in FIGS. 5A-5C, the inlet end 123 of the inner tube 74 may extend axially beyond the inlet end 125 of the outer tube 76. Advantageously, this configuration enables the inlet end 123 to be more easily accessed through the central opening of the riser flange 114 when applying the inner first weld 126 to the inlet end 123 during construction of the riser conduit 44, 46.

As shown best in FIG. 6, the first and second welds 126, 130 are continuous about the circumference of the inner tube 74 and the outer tube 76, respectively, so as to provide a liquid-tight seal of the riser cooling passage 96. Moreover, the inner and outer tubes 74, 76 may extend coaxially, and may be concentric with the first and second welds 126, 130 about a common center C as shown in FIG. 6.

As shown best in FIG. 4, the inner tube 74 of the lower riser section 52 may be formed with a uniform cross-sectional diameter along its entire length, extending between the riser flange 114 and the inlet cone portion 90 of the catalytic converter assembly 56. More particularly, as best shown in FIGS. 5A-5C, the inner tube 74 is formed with a uniform cross-sectional diameter throughout its horizontal inlet end portion extending from the riser flange 114. In this regard, the inner tube 74 is not outwardly expanded (e.g., flared) or otherwise deformed at its inlet end portion adjacent to the riser flange 114, nor at any other location along its length. As a result, the inner tube 74 is provided with a generally uniform wall thickness along its entire length, including along its inlet end portion extending horizontally from the riser flange 114. In other words, no portion of the inner tube 74 is mechanically deformed in a manner that would provide it with a decreased (or thinned) wall thickness that would compromise its strength relative to the remainder of the inner tube 74. Accordingly, and advantageously, this configuration of the inner tube 74 provides for optimal structural resistance to cracking when regularly exposed to extreme heat from the exhaust gases G passing through the inner tube 74, and to corrosive effects of salts precipitated from the cooling liquid L within the riser cooling passage 96, for example when the cooling liquid L includes water.

As shown best in FIGS. 5A-5C, the outer tube 76 of the lower riser section 52 may be spaced radially outward from the inner tube 74 throughout their inlet end portions, including at their inlet ends 123, 125. In exemplary embodiments, the outer tube 76 may be spaced radially outward from the inner tube 74 along an entire length of the outer tube 76 extending between the riser flange 114 and the inlet cone portion 90 of the catalytic converter assembly 56, such that the inner and outer tubes 74, 76 do not contact one another at all. In one embodiment, as shown in FIGS. 4-5C, the outer tube 76 may be formed with a uniform cross-sectional diameter along its entire length, so as to provide the riser cooling passage 96 with a uniform radial dimension along substantially the entire length of the lower riser section 52.

As a result of the radial spacing between the inner and outer tubes 74, 76 of the lower riser section 52 throughout their inlet end portions, including at their inlet ends 123, 125 (see FIG. 5C), the riser cooling passage 96 extends all the way to, and is closed by, the riser flange 114. More specifically, as shown best in FIGS. 5A and 5B, the rim 122 of the riser flange 114 may extend slightly into, and define an inlet end of, the riser cooling passage 96. Consequently, and advantageously, cooling liquid L flowing through the riser cooling passage 96 may directly contact and cool the riser flange 114, via the rim 122, during operation. Such cooling may facilitate maintaining the inlet end portion of the exhaust conduit 44, 46 at safe operating temperatures and prevent an overheating condition.

An additional advantage of the radial spacing between the inner and outer tubes 74, 76 shown in FIGS. 5A-5C is that the inlet end of the riser cooling passage 96, adjacent to the riser flange 114, is more adequately flushed with the cooling liquid L, thereby substantially decreasing the risk of entrapping precipitated salts and other particulate from the cooling liquid L, particularly when the cooling liquid includes "raw" water. Advantageously, reducing entrapment and collection of such salts and precipitates reduces corrosive effects that they might otherwise have on the inlet end portions of the inner and outer tubes 74, 76, thereby extending the useful life of the riser conduit 44, 46.

In exemplary embodiments, structural integrity of the exhaust system 20 may be further enhanced by constructing the riser conduits 44, 46 from 316L stainless steel, which exhibits enhanced corrosion resistance compared to other conventional grades of steel commonly used in marine applications. It will be appreciated that such construction may be applied to any of the exemplary embodiments disclosed herein.

Figure 7:
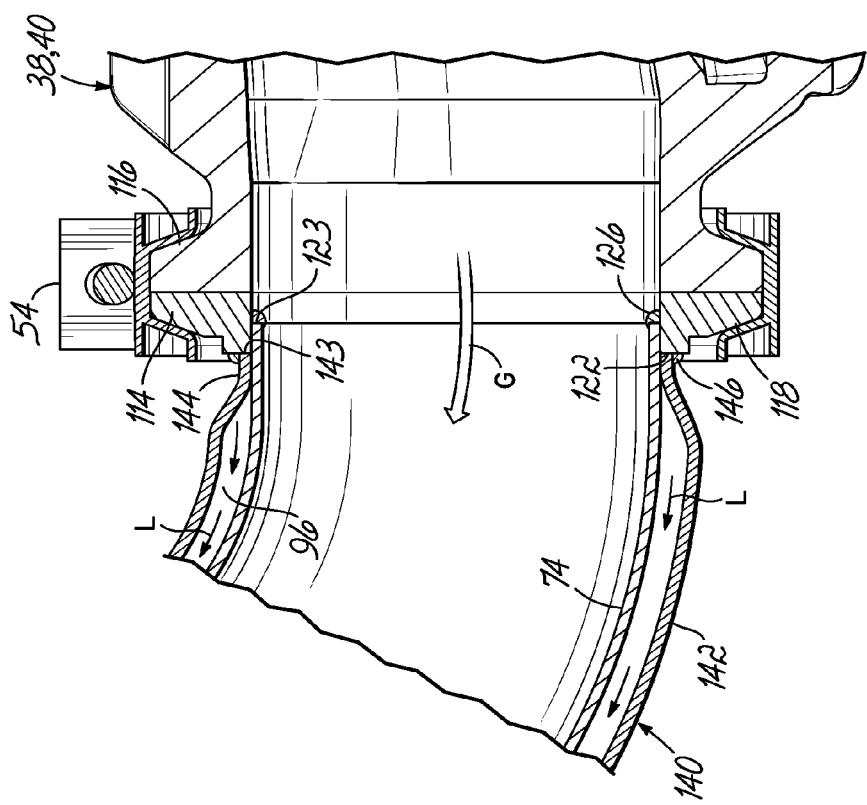
FIG. 7 is a side cross-sectional view of a marine engine exhaust system having an exhaust conduit according to another exemplary embodiment of the invention.

Referring to FIG. 7, a lower riser section 140 according to another exemplary embodiment of the invention is shown, for which like reference numerals refer to like features shown in the previous Figures. The lower riser section 140 includes an outer tube 142 having an inlet end 143 that tapers radially inward toward the inner tube 74 to define a circumferential pinched portion 144 at which the inner and outer tubes 74, 142 directly contact one another. The outer tube 142 abuts and is secured to an axial face of the annular rim 122 of the riser inlet flange 114 with a continuous circumferential weld 146.

Similar to lower riser section 52, lower riser section 140 includes an inner tube 74 formed with a uniform cross-sectional diameter along its entire length, including throughout its inlet end portion and at its inlet end 123. In this regard, the inner tube 74 is not outwardly expanded (e.g., flared) or otherwise deformed at its inlet end portion adjacent to the riser flange 114, nor at any other location along its length. As a result, the inner tube 74 is provided with a generally uniform wall thickness along its entire length, including along its inlet end portion extending horizontally from the riser flange 114. As described above, this configuration provides enhanced structural resistance to cracking when exposed to extreme heat from the exhaust gases G and corrosive effects of precipitated salts from the cooling liquid L within the riser cooling passage 96.

While the exemplary methods of welding inner and outer tubes 74, 76, 142 of an exhaust conduit 44, 46 to an exhaust conduit inlet flange 114 are shown and described herein in the context of exhaust systems having vertically oriented catalytic converter assemblies 56, it will be appreciated that these manufacturing methods are not so limited. In that regard, the disclosed methods may be applied to exhaust conduits having catalytic converter assemblies arranged in various other orientations, such as generally horizontal for example, or to exhaust conduits formed without catalytic converter assemblies and simply extending between an engine exhaust port and an exhaust system outlet.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. An exhaust conduit for a marine engine exhaust system, comprising:
    an inlet end portion and an outlet end portion that directs exhaust gases toward an exhaust system outlet;
    a catalytic converter assembly arranged between the inlet and outlet end portions;
    an inner tube that directs exhaust gases to the catalytic converter assembly;
    an outer tube surrounding the inner tube so as to define a cooling liquid passage between the inner and outer tubes; and
    a riser inlet flange welded to the inner and outer tubes at inlet ends thereof, the riser inlet flange having a cylindrical inner face defining a central opening, and a cross-sectional profile of non-uniform thickness configured to abut and releasably couple to an exhaust manifold outlet flange with a clamp,
    wherein the inner and outer tubes each have a uniform diameter between the riser inlet flange and the catalytic converter assembly, the inlet end of the inner tube extending axially beyond the inlet end of the outer tube.

2. The exhaust conduit of claim 1, wherein an inlet end of the inner tube is welded to the riser inlet flange by a first weld which extends along and contacts the cylindrical inner face of the riser inlet flange and an inlet end of the outer tube is welded to the riser inlet flange by a second weld which extends along and contacts an outer face of an annular rim of the riser inlet flange, the first and second welds being independent and separate from each other.

3. The exhaust conduit of claim 1, wherein only the inlet end of the inner tube extends inside the central opening of the riser inlet flange.

4. The exhaust conduit of claim 1, wherein the inlet end of the outer tube is spaced radially outward from the inner tube.

5. The exhaust conduit of claim 1, wherein the riser inlet flange defines an end of the cooling liquid passage.

6. The exhaust conduit of claim 1, wherein the annular rim of the riser inlet flange is between the inner and outer tubes.

7. The exhaust system of claim 1, wherein the inlet end of the inner tube extends beyond the outer face of the annular rim of the riser inlet flange and the inlet end of the outer tube abuts a shoulder of the riser inlet flange.

8. The exhaust conduit of claim 1, further comprising:
    a boss arranged on the outer tube, the boss configured to support a sensor for detecting a temperature of the outer tube.

9. The exhaust conduit of claim 8, wherein the boss is configured to support the sensor in contacting relation with the outer tube.

10. The exhaust conduit of claim 8, wherein the boss is arranged between the catalytic converter assembly and the flange.

11. In combination, a marine engine and an exhaust system including the exhaust conduit of claim 1.

12. An exhaust conduit for a marine engine exhaust system, comprising:
    an inlet end portion and an outlet end portion that directs exhaust gases toward an exhaust system outlet;
    a catalytic converter assembly arranged between the inlet and outlet end portions;
    an inner tube;
    an outer tube surrounding the inner tube so as to define a cooling liquid passage between the inner and outer tubes; and
    a riser inlet flange welded to the inner and outer tubes at inlet ends thereof and being configured to abut and releasably couple to an exhaust manifold outlet flange, the riser inlet flange comprising a cylindrical inner face defining a central opening, a shoulder and an annular rim having an outer face, wherein the inlet end of the inner tube is welded to the riser inlet flange by a first weld which extends along and contacts the cylindrical inner face of the riser inlet flange and the inlet end of the outer tube is welded to the riser inlet flange by a second weld which extends along and contacts the outer face of the annular rim of the riser inlet flange, the first and second welds being independent and separate from each other, the annular rim of the riser inlet flange being between the inner and outer tubes and the inlet end of the inner tube extending axially beyond the inlet end of the outer tube.

13. The exhaust conduit of claim 12, wherein the inner tube is joined to the riser inlet flange with the first weld arranged in non-contact relation with the outer tube.

14. The exhaust conduit of claim 13, wherein the second weld abuts the shoulder of the riser inlet flange.

15. The exhaust conduit of claim 12, wherein only the inlet end of the inner tube extends inside the central opening of the riser inlet flange.

16. An exhaust conduit for a marine engine exhaust system, comprising:
    an inlet end portion and an outlet end portion that directs exhaust gases toward an exhaust system outlet;
    a catalytic converter assembly arranged between the inlet and outlet end portions;
    an inner tube;
    an outer tube surrounding the inner tube so as to define a cooling liquid passage between the inner and outer tubes;
    a riser inlet flange secured to the inner and outer tubes at inlet ends thereof, the riser inlet flange having a cylindrical inner face defining a central opening and a cross-sectional profile of non-uniform thickness configured to abut and releasably couple to an exhaust manifold outlet flange;
    a first weld joining the inner tube to the riser inlet flange along the cylindrical inner face of the riser inlet flange the inlet end of the inner tube extending axially beyond the inlet end of the outer tube for easily access through the central opening of the riser inlet flange for making the first weld; and a second weld joining the outer tube to the riser inlet flange at a radially outer face of the annular rim.

17. The exhaust conduit of claim 16, wherein the inlet end of the inner tube extends along the radially inner face of the annular rim.

18. The exhaust conduit of claim 17, wherein the inlet end of the outer tube extends along the radially outer face of the annular rim.

19. The exhaust conduit of claim 16, wherein the inlet end of the inner tube extends axially beyond the inlet end of the outer tube.

20. The exhaust conduit of claim 16, wherein the inner tube and the outer tube are formed of 316L stainless steel.

* * * * *

UNITED STATES PATENT AND TRADEMARK OFFICE
CERTIFICATE OF CORRECTION

| | | |
|---|---|---|
| PATENT NO. | : 9,957,863 B2 | Page 1 of 1 |
| APPLICATION NO. | : 15/194002 | |
| DATED | : May 1, 2018 | |
| INVENTOR(S) | : Jason C. Stimmel et al. | |

It is certified that error appears in the above-identified patent and that said Letters Patent is hereby corrected as shown below:

In the Specification

Column 1
Line 5, add a "," after the word "and".

Column 6
Line 15, "such as the on" should be ---such as on---.

In the Claims

Column 10
Line 66, add a "," after the word "flange".

Column 11
Line 1, "easily" should be ---easy---.

Signed and Sealed this
Twenty-sixth Day of June, 2018

Andrei Iancu
*Director of the United States Patent and Trademark Office*